United States Patent [11] 3,633,994

| [72] | Inventor | Duane G. Carlson<br>Bronxville, N.Y. |
|---|---|---|
| [21] | Appl. No. | 803,862 |
| [22] | Filed | Mar. 3, 1969 |
| [45] | Patented | Jan. 11, 1972 |
| [73] | Assignee | International Business Machines Corporation<br>Armonk, N.Y. |

[54] LASER BEAM SCANNER
7 Claims, 5 Drawing Figs.

| [52] | U.S. Cl. | 350/160 |
|---|---|---|
| [51] | Int. Cl. | G02f 1/16 |
| [50] | Field of Search | 350/160, 161 |

[56] References Cited
UNITED STATES PATENTS

| 3,346,816 | 10/1967 | Midford et al. | 350/160 X |
|---|---|---|---|
| 3,384,433 | 5/1968 | Bloembergen | 350/160 X |
| 3,439,975 | 4/1969 | Smith | 350/160 X |

OTHER REFERENCES

Tell, B. et al., " Enhancement of Elasto-Optic Constants in the Neighborhood of a Band Gap in ZnO and CoS." Applied Physics Letters, Vol. 6, No. 7, Apr. 1, 1965. pp. 123– 124.

*Primary Examiner*—Ronald L. Wibert
*Assistant Examiner*—T. Major
*Attorneys*—Hanifin and Jancin and George Baron ABSTRACT: A laser beam scanner characterized by the use of directionally controlled acoustic gain in a semiconductor to control the deflection angle of an incident laser beam. As an addition to devices in which stimulated Brillouin scattering occurs, a source of gain is employed to control the direction of the Brillouin scattered laser beam. By varying the direction of maximum acoustic gain at the frequency that corresponds to the Bragg angle, the direction of the acoustic wave can be changed. The direction of maximum acoustic gain is controlled by controlling the direction of a DC electric field applied to the semiconductor or by controlling the magnitude of that electric field.

PATENTED JAN 11 1972 3,633,994

INVENTOR
DUANE G. CARLSON

BY *George Baron*
ATTORNEY

LASER BEAM SCANNER

BACKGROUND OF THE INVENTION

Light-beam steering, or scanning, is accomplished in general by the use of electro-optic prisms or by Brillouin scattering off a sound column that has been generated by a piezoelectric transducer. An example of generating Brillouin scattering without achieving scanning is shown in the Brewer et al. U.S. Pat. No. 3,392,368 which issued on July 9, 1968 on an application filed on Nov. 2, 1964. Such Brewer et al. patent taught how the liquid generates an acoustic wave when subjected to an intense laser beam of a given frequency $f_1$, such acoustic wave moving through the liquid in the same direction as the laser beam. The acoustic traveling wave that has been stimulated by the laser beam then acts as a partially transmissive mirror and reflects a portion of the original laser beam and transmits the remainder of the original laser beam. This scattered beam, referred to in the art as stimulated Brillouin scattering (SBS), has a frequency $f_2$ that is less than the frequency $f_1$ of the initial laser beam. Moreover, the acoustic wave that is generated has such a high frequency and the crests of the wave are so close to one another that the "scattered" light is effectively reflected from the acoustic wave.

The light is scattered or reflected off the sound wave at the Bragg angle $\alpha$, where, $\sin \alpha = \lambda/\lambda_s$. $\lambda$ is the wavelength of the laser beam, $\lambda_s$ is the wavelength of the acoustic wave, and $\alpha$ is the angle between the acoustical wave fronts and the scattered light beam. Such SBS is a high energy beam and one which it would be highly desirable to scan. Electro-optical prisms could be employed to scan such scattered beam, but such prisms permit scanning over relatively small angles.

The present invention achieves scanning by controlling the direction in which SBS occurs. SBS will occur for the direction in which the net gain (gain minus loss) of the scattered light wave and the generated acoustic wave is a maximum. The normal source of gain in SBS is due to parametric coupling of the acoustic wave and the optical waves through the phenomenon of electrostriction. Such gain is exploited in the practice of this invention. However, what is not taught by the prior art, as represented by the above noted Brewer et al. patent, is the control of the direction of the scattered light beam using an additional source of gain, namely, the acoustic gain seen by an acoustic wave in a piezoelectric semiconductor in the presence of a DC electric field. By sending a laser beam into a piezoelectric semiconductor to create SBS therein, the direction of the created acoustic beam can be changed by changing either the magnitude of the DC field applied to the piezoelectric semiconductor or the direction that such DC field is applied to said semiconductor.

Thus, in the present invention, a piezoelectric semiconductor is selected to be subjected to an intense laser beam of the order of 50 milliwatts/cm.$^2$ to 20 megawatts/cm.$^2$, or higher. The laser beam generates an acoustic wave in the semiconductor, such acoustic wave always being generated at the Bragg angle. A DC field, applied to the semiconductor during the presence of the acoustic wave, has its magnitude changed. Such change in magnitude causes the direction of travel of the acoustic wave to change, which in turn causes the direction of the light scattered from the acoustic wave to change, producing a scanning effect. In an alternative scheme, the magnitude of the DC field applied to the semiconductor is held constant, but the direction of the DC field is altered, resulting in a change in direction of the acoustic wave through the crystal and the consequent change in direction of the scattered laser beam off such wave. The scanning produced in this novel manner is found to be through an angle that is many orders of magnitude larger than may be achieved with electro-optic prisms and the amount of light scattered will be much greater than the amount scattered by normal Brillouin scattering.

Consequently, it is an object of this invention to attain an improved light scanner.

It is yet another object to provide a fast efficient light scanner that produces scanning over a wide angle.

A further object is to obtain a scanner employing the principles of stimulated Brillouin scattering.

The foregoing and other objects, features and advantages of the invention will be apparent from the following more particular description of preferred embodiments of the invention, as illustrated in the accompanying drawings.

BRIEF DESCRIPTION OF THE DRAWINGS

In FIG. 1 is shown an anisotropic piezoelectric crystal 2 of semiconductor material such as CdS, ZnS or ZnO, etc. For illustrating the operation of the invention, a 1 cm.$^3$ crystal of a suitable piezoelectric crystal is chosen, for example, CdS, and a voltage divider network 4 comprising resistors 6A, 6B...6F and electrodes 8A, 8B...8F is located on the top face 10 of the crystal 2 and a similar voltage divider network comprising resistors 10A...10E and electrodes 12A...12F is located on the face 12 that is parallel to face 10. Voltage sources 14 and 16 supply a uniform DC electric field throughout the length of the crystal 2. Voltage source 18 is variable. The orientation of DC field 19 in FIG. 1 occurs when the variable voltage source 18 is equal to zero. When a beam 20 of coherent polarized light, from a laser source 22, enters the crystal 2, an acoustic wave 21 is generated along the general direction of the DC field 19, and the scattered beam 20' is determined by the Bragg angle.

Figure 1:
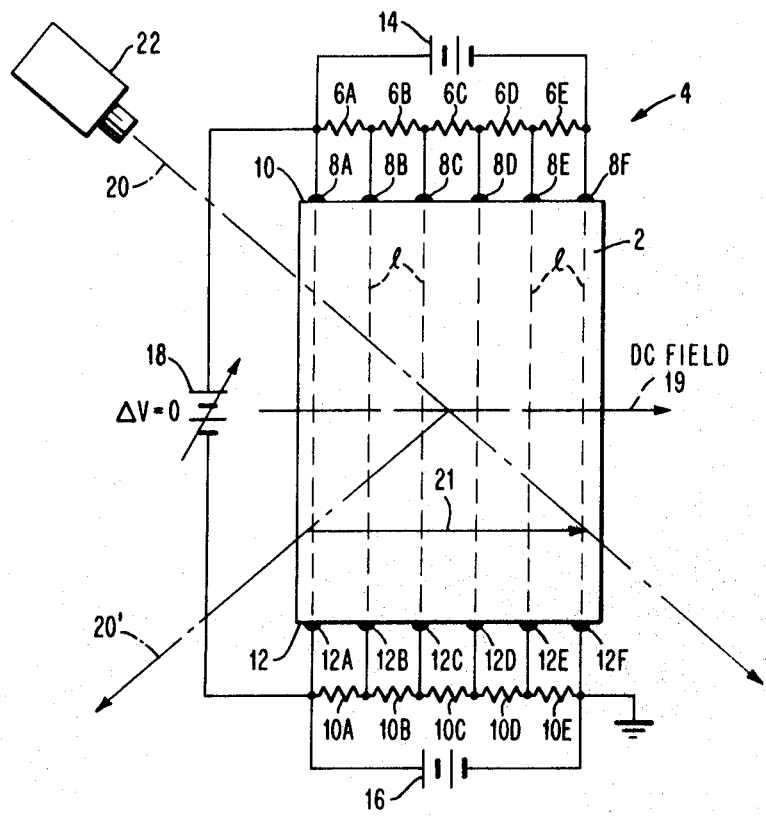
FIG. 1 is an embodiment of the invention employing a piezoelectric semiconductor crystal and an electric field applied to said crystal for obtaining stimulated Brillouin scattering along the direction of the electric field.

In the operation of the invention as set forth in FIG. 1, the laser beam 20, which could be pulsed or continuous wave operation, that enters the crystal 2 creates stimulated Brillouin scattering therein. That is, the laser beam 20 creates an acoustic traveling wave within the crystal 2. The thus created acoustic wave then acts as a partially transparent mirror, transmitting a portion of the original laser beam and reflecting or scattering another portion of the original laser beam. Such reflection will occur at the Bragg angle for which the net gain of the scattered light wave and the generated acoustic wave is a maximum. It is this reflected beam that is scanned.

Figure 2:
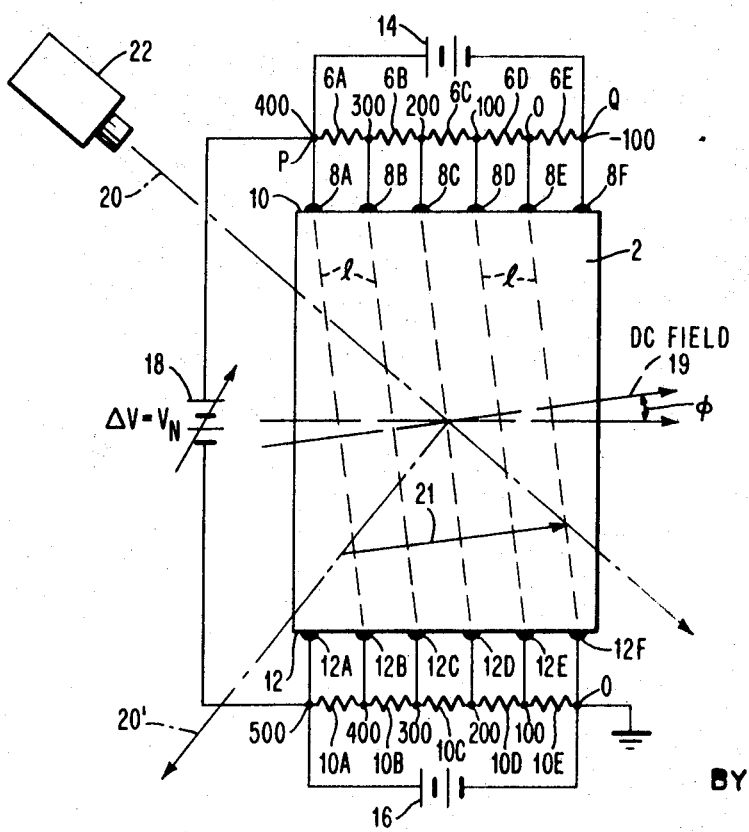
FIG. 2 depicts the operation of the device of FIG. 1 when the direction of the electric field is changed.

Assume, as seen in FIG. 2, that voltage source 14 and voltage source 16 are each at 500 volts and that variable voltage source 18 is continuously varied from zero voltage to a value of 100 volts. When voltage source 18 is at 100 volts, point P is at 400 v. and point Q at −100 v. Consequently, there is a change in the equipotential lines, represented as dotted lines $l$, in that electrodes 8A and 12B are each at 400 v., electrodes 8B and 12C are at 300 v., etc. It is seen, that as the voltage source 18 is operated so that its output voltage continuously varies, then the direction of the DC field 19 will vary through an angle $\phi$. Thus scanning is achieved by the simple expedient of altering the direction of an electric field in a piezoelectric semiconductor. As the direction of the electric field is changed by changing the orientation of the lines of equal potential $l$, the direction of minimum acoustic loss is altered. As a consequence, for a fixed incident beam 20, the acoustic wave that participates in the stimulated Brillouin scattered interaction is changed. Since the Bragg angle is always maintained for SBS, the scattered light k-vector or light beam 20 is changed in direction.

Figure 3:
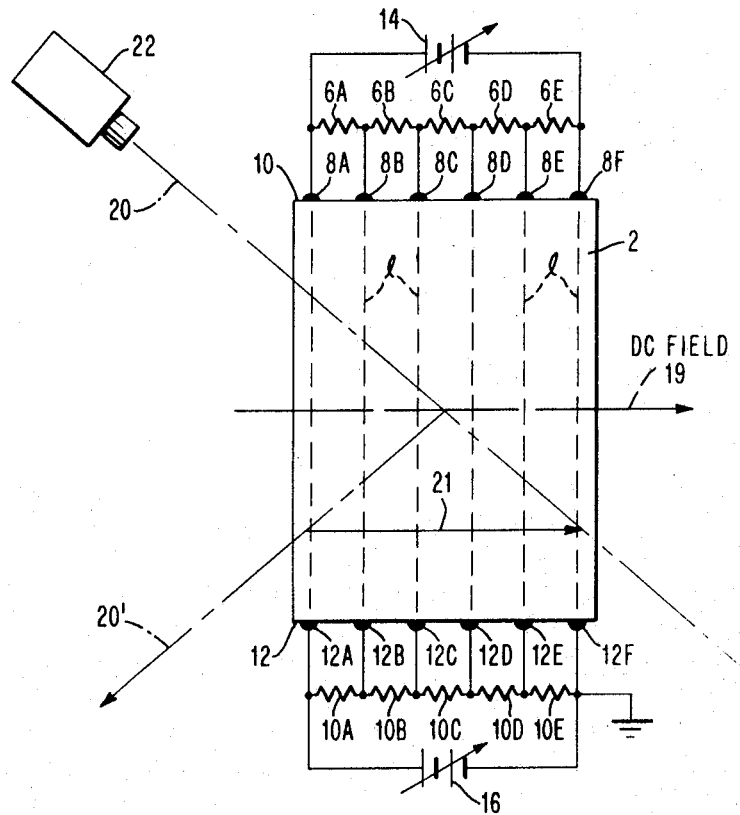
FIG. 3 depicts the operation of the device when the magnitude of the electric field is changed during the presence of stimulated Brillouin scattering.

The embodiment of the invention set forth in FIGS. 1 and 2 teach how to obtain scanning of a polarized beam by employing SBS in a piezoelectric semiconductor to generate an acoustic wave within the semiconductor and then altering the direction of the generated acoustic wave by changing the direction of the electric field in that semiconductor. FIG. 3 is a modification of FIGS. 1 and 2 in that scanning is achieved by changing the magnitude of the electric field E applied to the semiconductor crystal 2, but keeping the orientation of the equipotential lines *1*. unchanged. Thus, while the laser beam 20 impinges on the crystal 2, the magnitudes of voltage sources 14 and 16 are increased, increasing the value of the equipotential lines *1*.

Figure 4:
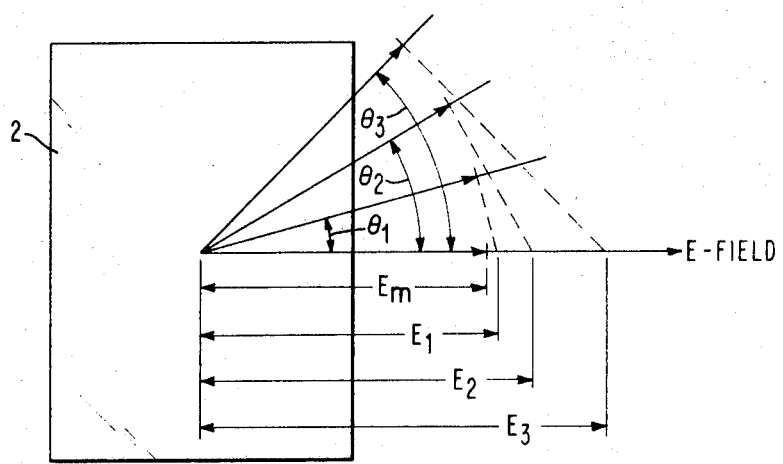
FIG. 4 depicts how scanning of the scattered laser beam takes place as a result of changing the magnitude of the electric field applied to the transducer.
Figure 5:
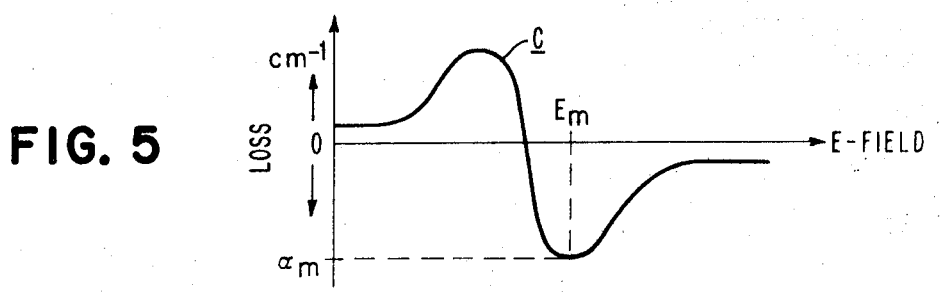
FIG. 5 is a plot of acoustic loss in the crystal v. electric field applied to the crystal as an aid in understanding the scanning effect of the invention.

How the scattered light being reflected from the acoustic wave generated by the laser beam 20 is scanned when the magnitude of the electric field E is increased is better understood by looking at FIGS. 4 and 5 of the drawings. FIG. 5 is a plot of the absorption of the acoustic energy as the wave travels into the medium supporting the wave. Increasing field E is depicted as going in the direction of the arrow on the abscissa of the drawing and positive losses are represented on the vertical axis about the "0" point and negative losses are on the vertical axis below the "0" point. According to the plot shown in FIG. 5, curve C shows that the maximum gain of the acoustic wave through the crystal 2 occurs when the electric field has a value of $E_m$. If one were to plot the power P of the acoustic wave as a function of depth of penetration into the crystal 2, then $$P = P_0 e^{-\alpha L}$$

where $P_o$ is the original power of the acoustic beam, $L$ is the length of travel into the crystal 2 and $\alpha$ is the absorption coefficient of the crystal 2.

The value of $\alpha_m$ that corresponds to the value $E_m$ on curve C is negative, so that $P$ has a larger value than $P_o$ at this negative value. If the electric field E has a value greater than $E_m$, then the maximum gain of the acoustic wave is no longer in the direction of the electric field E, but in the direction of $E_m$. Thus, as the electric field is increased beyond $E_m$, the maximum gain of such acoustic wave is in a direction of $E_m = E \cos \theta$. Since the acoustic loss has a minimum value $\alpha_m$ which occurs for a specific value of electric field, namely, $E_m$, then as the applied electric field is increased beyond $E_m$, the minimum loss no longer occurs in the direction of the electric field, but in the direction $\theta$, where $E \cos \theta = E_m$. Thus, by increasing $E$, the value of $\theta$ must increase to keep $E_m$ constant, and such changing values of $\theta$ are what effectively results in the scanning of the original laser beam 20 by the laser-generated acoustic wave. FIG. 4 depicts different values of $\theta$ for different values of $E$.

The present invention exploits two sources of gain to achieve an effective scanner. First, by employing the principle of stimulated Brillouin scattering, an acoustic wave is always generated in the direction of maximum gain in a semiconductor, all other acoustic waves not being generated in the semiconductor. Then by changing either the magnitude of an electric field in the semiconductor or the direction of that electric field in the semiconductor, one retains the maximum gain in the semiconductor but alters the direction of that maximum gain in the semiconductor. As a consequence, a simple, efficient and rapid scanner is attained. Moreover, the scanner is applicable to monochromatic coherent light beams, such as lasers, so that an intense beam of light can be scanned.

In the embodiment of the invention of FIG. 2 where the electric field is directly stored, representative values for 1 cm.³ of a piezoelectric semiconductor 2 are 1,500 volts for sources 14 and 16 and a range of ±100 volts for variable voltage source 18. The angle of scan is ±3.83°. In the embodiment of the invention of FIG. 3 where the electric field is scanned by changing the magnitude of the voltage applied to crystal 2, the original voltage sources 14 and 16 are 1,000 volts and for gradual increases of voltage to 1,200 volts, a scanning angle $\theta$ equal to ≈4.8° is achieved.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A scanning device comprising a piezoelectric semiconductor,
    means for creating an electric field within said semiconductor along a given direction in said semiconductor,
    means for causing stimulated Brillouin scattering in said semiconductor at a given angle to said given direction, and
    means for continuously varying either the magnitude or direction of said electric field so as to effect a continuous change in angle of said scattering.

2. The scanning device of claim 1 wherein said semiconductor is CdS.

3. The scanning device of claim 1 wherein said semiconductor is ZnS.

4. The scanning device of claim 1 wherein said semiconductor is ZnO.

5. A scanning device comprising a piezoelectric semiconductor,
    means for creating an electric field within said semiconductor along a given direction in said semiconductor,
    means for applying a monochromatic coherent beam to said semiconductor of sufficient energy to generate an acoustic wave along the direction of said electric field whereby a portion of said beam is reflected at a predetermined angle from said generated acoustic wave, and
    means for continuously changing the direction of said electric field within the semiconductor so as to effect a continuous change in direction of said reflected beam.

6. A scanning device comprising a piezoelectric semiconductor,
    means for creating an electric field along a given direction in said semiconductor,
    means for applying a monochromatic coherent beam to said semiconductor of sufficient energy to generate an acoustic wave along the direction of said electric field whereby a portion of said beam is reflected at a predetermined angle from said generated acoustic wave, and
    means for continuously increasing the magnitude of said electric field within the semiconductor so as to effect a continuous change in direction of said reflected beam.

7. The scanning device of claim 6 wherein said beam is derived from a laser.

* * * * *